United States Patent [19]

Starner et al.

[11] Patent Number: 5,480,958
[45] Date of Patent: Jan. 2, 1996

[54] POLYEPOXIDE RESINS INCORPORATING EPOXY TERMINATED URETHANES AS TOUGHENERS

[75] Inventors: William E. Starner, Nesquehoning; Richard S. Myers, Kutztown, both of Pa.

[73] Assignee: Air Products and Chemicals, Inc., Allentown, Pa.

[21] Appl. No.: 309,712

[22] Filed: Sep. 21, 1994

[51] Int. Cl.$^6$ .................................................. C08G 18/58
[52] U.S. Cl. ........................... 528/96; 525/504; 525/526
[58] Field of Search ................................................ 528/96

[56] References Cited

U.S. PATENT DOCUMENTS

| | | | |
|---|---|---|---|
| 3,413,377 | 11/1968 | Schramm et al. | 528/96 |
| 3,694,406 | 9/1972 | D'Alelio | 528/48 |
| 3,737,406 | 6/1973 | D'Alelio | 260/47 |
| 3,876,618 | 4/1975 | Clark | 260/47 |
| 4,163,096 | 7/1979 | Seiz et al. | 528/73 |
| 4,424,316 | 1/1984 | DiSalvo et al. | 528/59 |
| 4,562,227 | 12/1985 | Rogler et al. | 264/328.1 |
| 4,719,267 | 1/1988 | Rizk et al. | 525/424 |
| 4,742,146 | 5/1988 | Hefner | 528/79 |
| 5,112,932 | 5/1992 | Koenig et al. | 528/52 |

*Primary Examiner*—Frederick Krass
*Attorney, Agent, or Firm*—Russell L. Brewer; Mary E. Bongiorno

[57] ABSTRACT

This invention relates to improved one part polyepoxide resins which are tough and have enhanced flexible and elastic properties. The polyepoxide resins comprise a polyepoxide resin based on a polyglycidyl ether of a phenol, an oxazolidone toughener and a latent amine curative. The improvement in the polyepoxide resin formulation comprises incorporating an oxazolidone toughener represented by the formula:

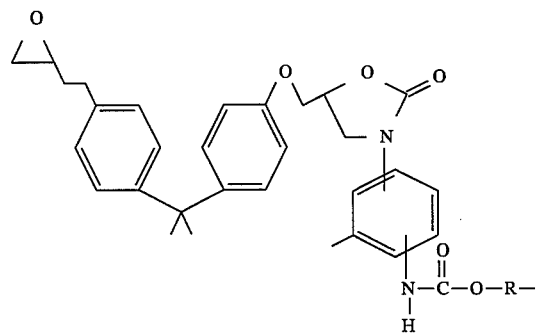

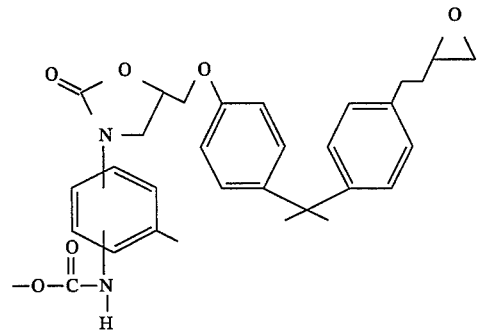

wherein R is the residue of an aliphatic glycol or aliphatic ether glycol having from 2 to 20 carbon atoms.

7 Claims, No Drawings

5,480,958

POLYEPOXIDE RESINS INCORPORATING EPOXY TERMINATED URETHANES AS TOUGHENERS

FIELD OF THE INVENTION

This invention pertains to one part epoxy resin formulations having enhanced fracture toughness.

BACKGROUND OF THE INVENTION

Aromatic polyepoxide resins, particularly those based upon the use of polyglycidyl ethers of bisphenol A, have widely been used in applications requiring resistance to high temperature and resistance to chemicals. They have been widely used for preparing electrical laminates for circuit board applications and composites.

Heat cured epoxy resins incorporating a heat activated curing agent have been widely used in applications requiring high resistance to chemicals such as electrical lamination and sealants. One of the problems with epoxy resins is their brittleness and attempts have been made to modify these resins through the addition of toughening agents. Toughening agents are based upon the incorporation of aliphatic diepoxides and ester type plasticizers. More recent technology describes incorporation of urethane polymers and carboxy terminated polybutadiene/acrylonitrile copolymers and epoxy adducts of such copolymers.

Representative patents and literature which describe polyepoxide resins and the approach to enhancing the physical properties of the polyepoxide resins through incorporation of urethanes, rubber, etc., are as follows:

U.S. Pat. No. 3,876,618 discloses oxazolidinone modified triglycidyl ethers of trihydroxy triphenyl methane and their derivatives cured with polyamines to form thermoset resins having outstanding physical properties, adhesion to metals, etc., with utility in the encapsulation of electrical components, laminates for electronic printed circuit boards at elevated temperatures, etc. In producing the oxazolidinone modified triglycidyl ethers, a triglycidyl ether of trihydroxy triphenyl methane is reacted with a polyisocyanate such as toluenediisocyanate, methylene di(phenylisocyanate) and isophoronediisocyanate under conditions such that the isocyanate and epoxy react to form the oxazolidinone structure.

U.S Pat. No. 3,737,406 discloses a process for preparing polyoxazolidones, wherein a polyepoxide is reacted with a polyisocyanate in the presence of chemically reactive epoxy-onium catalyst. The products have a wide range of application such as electrical potting, encapsulant, caulking and adhesive as well as concrete cementing agent.

U.S. Pat. No. 4,163,096 discloses epoxy resins having enhanced toughness imparted thereto wherein the epoxy resins are hardened with liquid polymers containing reactive end groups; e.g., butadiene-acrylonitrile polymers having carboxyl end groups. High viscosity is the problem associated with this product. To alleviate high viscosity, a portion of the glycidyl ether of the polyphenol is reacted with a monoisocyanate, e.g., an aromatic, an aliphatic, cycloaliphatic or aliphatic isocyanate.

U.S. Pat. No. 4,742,146 discloses the use of urethane oligomer modified epoxy resins formed by the copolymerization of an epoxy resin and a urethane oligomer containing an oxyalkylene group and polymerizable ethylenically unsaturation in the presence of a catalyst sufficient for effecting oxazolidone formation. The modified epoxy resin compositions can be cured with conventional curing agents and to prepare urethane modified vinyl ester resins.

U.S. Pat. No. 4,424,316 discloses products formed by the reaction of a diepoxide with mono- and preferably dicarboxylic acids followed by reaction with a polyisocyanate to form a poly(oxazolidone/urethane) thermoset composition. The thermoset compositions are suited for fabrication of molded articles and can be combined with conventional reinforcing agents, e.g., glass fiber, aromatic polyamide fiber, etc.

U.S. Pat. No. 4,562,227 discloses the production of heat hardenable reaction resin mixtures containing polyfunctional epoxides and polyfunctional isocyanates. One component of the resin reaction mixture is an isocyanate prepolymer formed by reacting a polyisocyanate with a diol where the isocyanate is reacted in a proportion of 0.01 to 0.35 equivalence per diol, and the resulting isocyanate prepolymerizate in a polymethylene polyphenyl isocyanate and an epoxy resin is reacted. Oxazolidone and isocyanate (OX/ICR) formation is effected through the use of an accelerator.

U.S. Pat. No. 5,112,932 discloses epoxy terminated polyoxazolidones formed by reacting a polyisocyanate with an epoxide. A combination of oxazolidone rings and isocyanurate rings can be achieved.

U.S. Pat. No. 4,719,267 discloses heat curable, one package epoxy resins incorporating polyurethane prepolymers having amine blocked isocyanate groups. Blocked amine curing agents are incorporated into the resin to form sealants.

SUMMARY OF THE INVENTION

This invention relates to improved one part polyepoxide resins having enhanced toughness and resistance to fracture. The polyepoxide resins comprise a polyepoxide resin based on a polyglycidyl ether of a phenol, an oxazolidone toughener and a latent curative. The improvement in the polyepoxide resin formulation comprises incorporating an oxazolidone toughener; an example is represented by the formula:

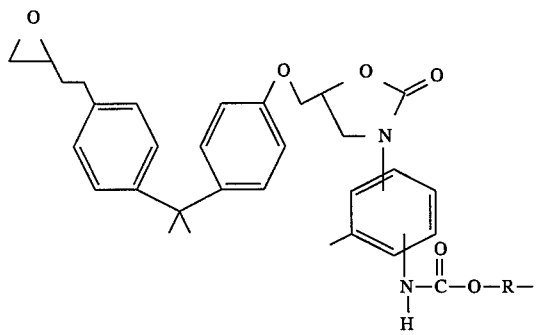

-continued

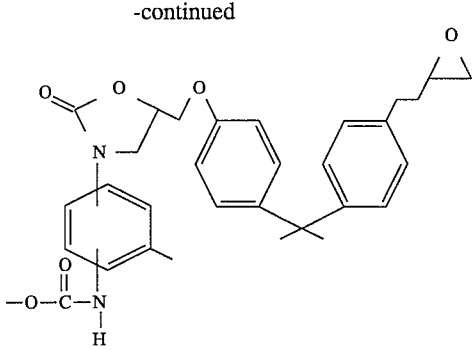

wherein R is the residue of an aliphatic glycol or aliphatic polyether glycol having from 2 to 20 carbon atoms.

There are several advantages associated with the cured polyepoxide resin of this invention and these advantages include:

- an ability to produce a curable formulation having excellent chemical and moisture resistance which is well suited electrical and composite applications;
- an ability to formulate a low viscosity epoxy resin, comparable to many conventional epoxy resins; and
- an ability to produce a product polyepoxide resin which has a high degree of fracture toughness.

DETAILED DESCRIPTION OF THE INVENTION

In producing a formulation for the curable polyepoxide resin, a recommended formulation for producing the toughened polyepoxide resin is as follows:

1. Polyglycidyl ether of an aromatic alcohol, i.e., a phenol type component—80 to 95 parts by weight( 80 to 95 percent by weight);
2. Epoxy-terminated urethane prepolymer incorporating oxazolidone structure—5 to 20 parts by weight (5 to 20 percent by weight);
3. Latent curative such as dicyandiamide and an accelerator.

The polyepoxide resins useful for practicing the present invention are those polyglycidyl ethers of phenolic type compounds having terminal 1,2-epoxy groups. The epoxide equivalents of these glycidyl ethers is greater than one and the equivalent weight ranges from 150 to 10000 preferably 150 to 1500. Polyglycidylethers of bisphenol A are particularly suited as polyepoxides for the production of composities and electrical circuit boards and the resin includes polyglycidyl ethers of phenol/formaldehyde and diphenol/formaldehyde novolacs as well as the polyglycidyl ethers of tri(hydroxyphenyl)methane and tetra(hydroxyphenyl)ethanes and propanes.

Epoxy-terminated urethane prepolymers incorporating the oxazolidone structure comprise the reaction product of an isocyanate-terminated urethane prepolymer and a polyepoxide. Isocyanate-terminated prepolymers are prepared by reacting a polyfunctional isocyanate, typically an aromatic diisocyanate, with a polyol, preferably a long chain polyether or polyester polyol, such as ethylene and propyleneoxide adducts of $C_2$ to $C_4$ polyols. For enhanced toughening of the polyepoxide resin, the molecular weight (mw) of the polyol should range from about 1000 to 8000, preferably from about 3000 to 4000.

The preferred polyisocyanate prepolymer can be prepared by any known means, for example, a 2000 mw polypropylene glycol can be reacted with an 80/20 2,4/2,6-toluenediisocyanate mixture to produce the isocyanate terminated prepolymer. Any polyisocyanate such as methylenedi(phenyldiisocyanate) (MDI), isophoronediisocyanate (IPDI) or para-phenylenediisocyanate (PPDI) is also suitable.

The epoxy terminated urethane prepolymers then are prepared by reacting the isocyanate-reactive prepolymers with a polyepoxide resin under conditions for forming the epoxy terminated urethanes incorporating the oxazolidone structure. An example is represented by the structure:

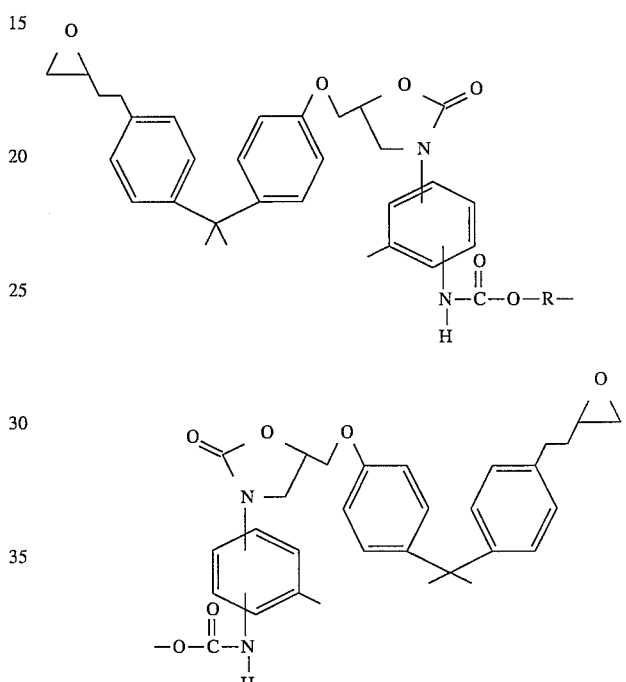

wherein R is the residue of an aliphatic glycol or aliphatic polyether glycol having 2 to 20 carbon atoms.

Reaction is carried out in the presence of a catalyst; e.g., potassium acetate at temperatures of from 120° to 190° C. In the absence of a catalyst, the oxazolidone structure may not be obtained.

The latent curative for forming the cured polyepoxide resin product include dicyandiamide and the like.

Dicyandiamide is the preferred latent amine and it can be used with other amines, e.g., aromatic diamines like methylenedianiline and hydrogenated derivatives, isophoronediamine, and the like. Generally, any aromatic or alicyclic diamine or latent amine curative used as an epoxy curative for heat cured applications may be utilized.

The resulting epoxy terminated polyurethane, as tougheners, have viscosities in the 400–600 poises range, whereas commercial tougheners based upon carboxyl terminated butadiene/acrylonitrile copolymers have viscosities in the range of 3000–8000 poises. Lower viscosities are easier to accommodate in industrial equipment.

To summarize, the physical properties and particularly the degree of toughness is generally dependent upon the ratio of toughener and amine and bisphenol A resin.

The following examples are provided to illustrate various embodiments of the invention and are not intended to restrict the scope thereof.

EXAMPLE 1

Preparation of Epoxy-Terminated Urethane Prepolymer incorporating Oxazolidone Structure (ETU)

A polyisocyanate prepolymer was first prepared by reacting 107 g of 80/20 TDI (0.61 moles) and 875 g of 3000 Mw polypropylene glycol (PPG) (0.29 moles). The materials were mixed together and heated to 80° C. with agitation under a nitrogen blanket. The temperature was held between 80° and 90° C. for 8–10 hours with agitation.

The ETU was then prepared by adding 2048 g of bisphenol A diglycidyl ether (Epon 828, which is available from Shell Oil Company and which has an average epoxide equivalent of 185–192) and 0.8 g of anhydrous potassium acetate and heating the resulting mixture to 160° C. After 1 hour at 160° C., all traces of isocyanate were gone according to IR measurements. A 99% recovery (3000 g) was obtained. The ETU concentration was 40% with an epoxy equivalent weight of 300 and a viscosity of 560 poise.

EXAMPLE 2

Preparation of Epoxy-Terminated Urethane Prepolymer Incorporating Oxazolidone Structure (ETU)

A polyisocyanate prepolymer was prepared by reacting 182.7 g of 80/20 TDI (1.05 moles) and 1000 g of 2000 Mw PPG (0.5 moles). The materials were mixed together and heated to 80° C. with agitation under a nitrogen blanket. The temperature was held between 80° and 90° C. for 8–10 hours with agitation.

The ETU was then prepared by adding 2713 g of bisphenol A diglycidyl ether (Epon 828) and 0.8 g of anhydrous potassium acetate and heating the resulting mixture to 160° C. After 1 hour at 160° C., all traces of isocyanate were gone according to IR measurements. A 99% recovery (3895 g) was obtained. The ETU concentration was 40% with an epoxy equivalent weight of 290 and a viscosity of 600 poise.

EXAMPLE 3

Preparation of Epoxy-Terminated Urethane Prepolymer Incorporating Oxazolidone Structure (ETU)

A polyisocyanate prepolymer was prepared by reacting 91 g of 80/20 TDI (0.525 moles) and 1000 g of 4000 Mw PPG (0.25 moles). The materials were mixed together and heated to 80° C. with agitation under a nitrogen blanket. The temperature was held between 80° and 90° C. for 8–10 hr with agitation. The ETU was then prepared by adding 2130 g of bisphenol A diglycidyl ether (Epon 828) and 0.8 g of anhydrous potassium acetate and heating the resulting mixture to 160° C. After 1 hr at 160° C. all traces of isocyanate were gone according to IR measurements. A 994 recovery (3188 g) was obtained. The ETU concentration was 40% with an epoxy equivalent weight of 300 and a viscosity of 500 poise.

EXAMPLE 4

Preparation of One Part Heat Cured Epoxy Resin

The formulations in this study were comprised of 37.5 phr toughening additive containing 40% active toughener, 6 phr dicyandiamide (DICY) and 2 phr Amicure UR catalyst using Epon 828 epoxy resin. The test specimens were cured at 140° C. for 1 hr. Table 1 sets forth the results.

TABLE 1

| | TOUGHENING AND ADHESIVE COMPARISON OF ETU AND CTBN | | | | |
|---|---|---|---|---|---|
| Column Formulation | 1 Amicure UR DICY Epon 828 | 2 Amicure UR DICY Epi-Rez58005 Epon 828 | 3 Amicure UR DICY 2000 ETU Epon 828 | 4 Amicure UR DICY 3000 ETU Epon 828 | 5 Amicure UR DICY 4000 ETU Epon 828 |
| TENSILE STRENGTH (PSI) | 12000 | 9200 | 7900 | 8200 | 3470 |
| MODULUS (KSI) | 449 | 361 | 443 | 361 | 179 |
| ELONGATION (%) | 5.1 | 4.1 | 2.7 | 3.1 | 3.2 |
| FRACTURE TOUGHNESS | | | | | |
| $K_{1C}$ (PSI IN$^{1.5}$) | 766 | 1588 | 1536 | 1416 | 1317 |
| $G_{1C}$ (PSI IN) | 1.1 | 5.9 | 4.47 | 4.66 | 8.12 |
| LAP SHEAR | | | | | |
| STRENGTH @ 25 C. (PSI) | 1123 | 1616 | 1719 | 1928 | 1292 |
| STRENGTH @ 93 C. (PSI) | 598 | 1747 | 570 | 2354 | 488 |
| PEEL STRENGTH (PLI) | 2.2 | 9.4 | 10.3 | 14.0 | 9.9 |
| GLASS TRANSITION Tg (°C.) | 135 | 124 | | 150 | |

CASTINGS:

TABLE 1-continued

TOUGHENING AND ADHESIVE COMPARISON OF ETU AND CTBN

| Column<br>Formulation | 1<br>Amicure UR<br>DICY<br>Epon 828 | 2<br>Amicure UR<br>DICY<br>Epi-Rez58005<br>Epon 828 | 3<br>Amicure UR<br>DICY<br>2000 ETU<br>Epon 828 | 4<br>Amicure UR<br>DICY<br>3000 ETU<br>Epon 828 | 5<br>Amicure UR<br>DICY<br>4000 ETU<br>Epon 828 |
|---|---|---|---|---|---|

All one part epoxy formulations were thoroughly mixed and degassed. Formulations were poured into molds (8 × 7 × ⅛ inch), preheated to 140° C. and cured for 1 hour at 140° C.
TEST PROCEDURES:
Stress/strain - ASTM D-638
Fracture energy by compact tension - ASTM E-399-83
Lap shear - ASTM D-1002
Peel - D-1876
Tg - Mettler DSC Column 1 of Table 1 shows the properties of a cured one part epoxy formulation containing no toughener. Column 2 shows the effect of Epi-Rez 58005 (a commercial adduct of a carboxy terminated butadiene-acrylonitrile and Bisphenol A epoxy resins dissolved in excess resin). Columns 3, 4 & 5 show the effect of ETUs prepared from various molecular weight polypropylene glycols. The best properties were obtained with the ETU prepared from a 3000 Mw PPG. In addition to improving the fracture toughness and adhesive properties, the 3000 ETU also has a positive impact on the glass transition temperature (Tg). The Tg of the 3000 ETU formulation is higher than both the non-toughened formulation and the formulation toughened with Epi-Rez 58005.

To summarize, it has been found that the addition of an ETU to a one component heat cured epoxy formulation increases the fracture toughness, and adhesive and peel strength of the resulting polymer. A comparative study of ETU versus Epi-Rez 58005 shows that the ETU's impart similar toughness and much better lap shear and peel strengths.

What is claimed is:

1. In a one-part curable epoxy resin comprising a polyglycidyl ether of a phenol having terminal 1,2-epoxy groups, a latent curative and an accelerator, the improvement for enhancing toughness of the epoxy resin which comprises incorporating an epoxy-terminated urethane prepolymer incorporating an oxazolidone structure into the one-part curable epoxy resin represented by the formula:

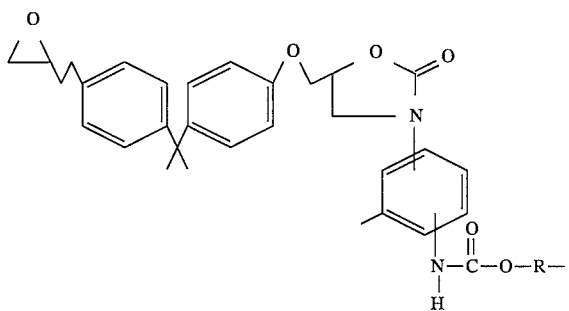

-continued

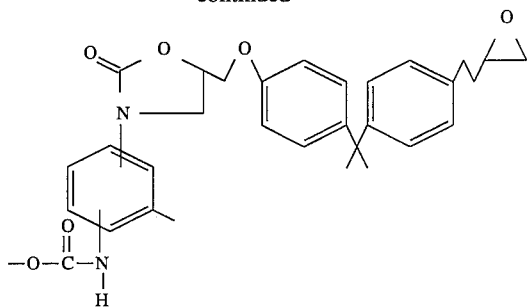

wherein R is the residue of an aliphatic polyether glycol having a weight average molecular weight of about 3,000, wherein said curable epoxy resin contains 5 to 20 parts by weight epoxy-terminated urethane prepolymer and 80 to 95 parts by weight said polyglycidyl ether of a phenol, based on 100 parts of the total weight of the two combined.

2. The epoxy resin of claim 1 wherein the aliphatic polyether glycol is selected from the group consisting of polyethylene glycol, polypropylene glycol and polytetramethylene glycol.

3. The epoxy resin of claim 2 wherein the epoxy-terminated urethane prepolymer is produced from a diglycidyl ether of bisphenol A which has an equivalent weight of from 150 to 192.

4. The epoxy resin of claim 3 wherein the curable epoxy resin comprises from about 5 to 20 parts by weight of the epoxy-terminated urethane prepolymer incorporating the oxazolidone structure and 80 to 95 parts by weight of a diglycidyl ether of bisphenol A, based on 100 parts of the total weight of the two combined.

5. The epoxy resin of claim 4 wherein the latent curative is dicyandiamide.

6. The epoxy resin of claim 4 wherein the isocyanate used to produce the epoxy terminated urethane prepolymer is a mixture of 2,4 and 2,6-toluenediisocyante the weight percent 2,4- being about 80% and the weight percent 2,6- being about 20 percent.

7. The epoxy resin of claim 5 wherein the aliphatic polyether glycol is polypropylene glycol.

* * * * *